United States Patent
Nagalski

[19]

[11] Patent Number: 6,056,268
[45] Date of Patent: May 2, 2000

[54] ADJUSTABLE THROTTLE STOP

[75] Inventor: Daniel W. Nagalski, Warren, Mich.

[73] Assignee: Chrysler Corporation, Auburn Hills, Mich.

[21] Appl. No.: 09/162,669

[22] Filed: Sep. 29, 1998

[51] Int. Cl.[7] ............................................. G05G 1/04
[52] U.S. Cl. ............................ 251/295; 74/513; 74/526
[58] Field of Search ............................... 251/295; 74/513, 74/532, 526

[56] References Cited

U.S. PATENT DOCUMENTS

| | | | |
|---|---|---|---|
| 1,929,522 | 10/1933 | Schulte | 251/295 |
| 2,117,421 | 5/1938 | Holden | 251/295 |
| 2,186,620 | 1/1940 | Aprea et al. . | |
| 2,847,875 | 8/1958 | Drain . | |
| 2,866,356 | 12/1958 | Elam . | |
| 2,917,142 | 12/1959 | Thorner . | |
| 2,960,885 | 11/1960 | Donaldson . | |
| 2,964,965 | 12/1960 | Hanson . | |
| 3,293,937 | 12/1966 | Gardner . | |
| 3,327,818 | 6/1967 | Gardner . | |
| 3,543,601 | 12/1970 | Berger . | |
| 3,643,524 | 2/1972 | Herring . | |
| 3,724,287 | 4/1973 | Dreeben . | |
| 3,837,238 | 9/1974 | Walsh . | |
| 4,546,667 | 10/1985 | Bopst, III . | |
| 5,012,689 | 5/1991 | Smith . | |
| 5,076,232 | 12/1991 | Pfalzgraf et al. . | |
| 5,417,127 | 5/1995 | Bueti et al. . | |
| 5,421,217 | 6/1995 | Loustaunau . | |
| 5,676,220 | 10/1997 | Dapsi et al. . | |

*Primary Examiner*—Steven O. Douglas
*Attorney, Agent, or Firm*—James R. Yee

[57] ABSTRACT

A tool for limiting the amount by which an accelerator pedal lever may be actuated so as to restrict the maximum opening of a throttle valve to a predetermined maximum amount. The tool includes a first member positioned proximate to the accelerator pedal lever and fastened to the vehicle, a second member threadably engaged with the first member, and a third member which is secured to the dash panel of the vehicle and operably prevents axial movement of the second member while allowing the second member to rotate. The tool is easily adjusted by rotating the second member so as to change the effective length of the tool.

5 Claims, 3 Drawing Sheets

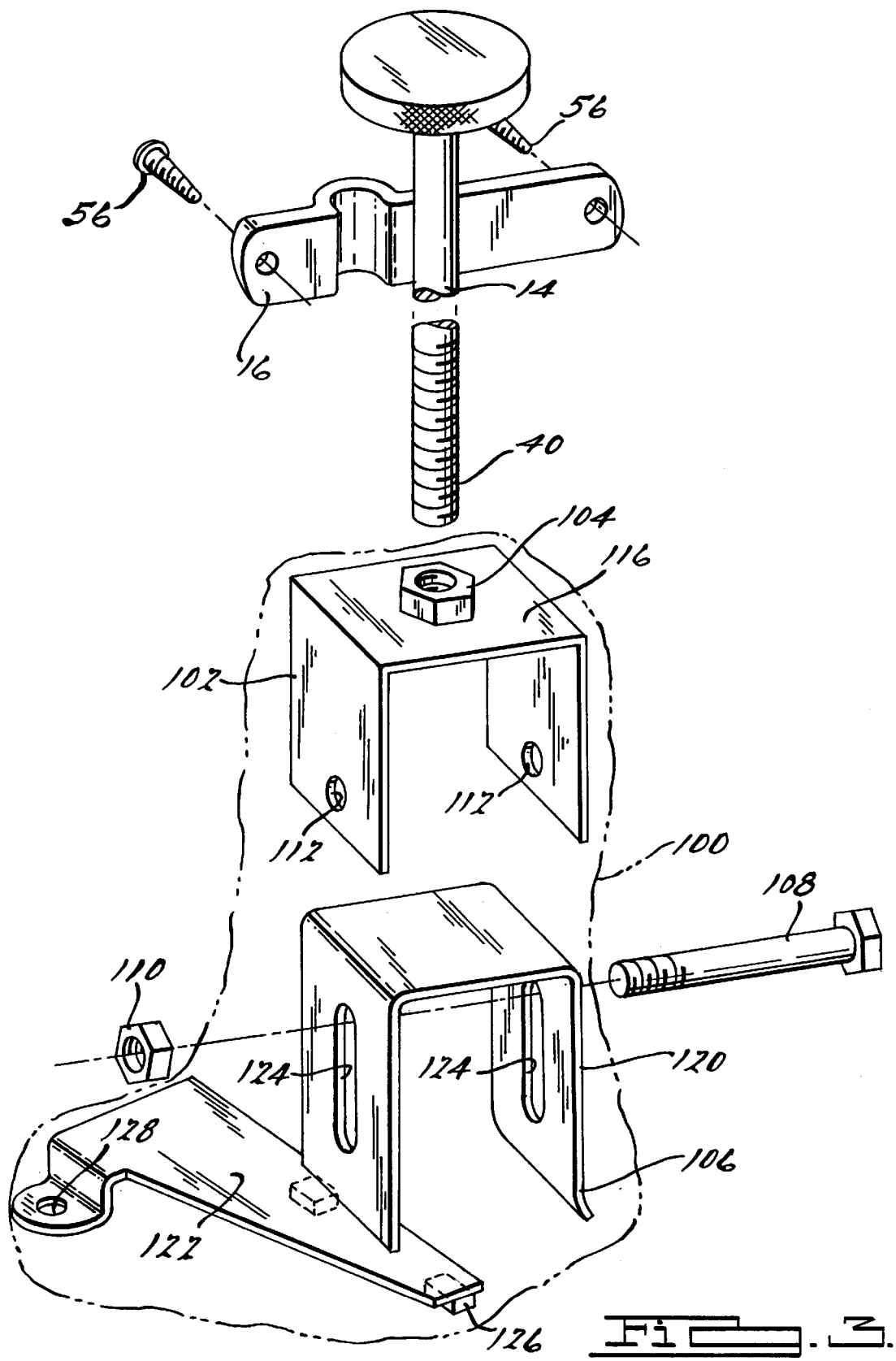

ADJUSTABLE THROTTLE STOP

BACKGROUND OF THE INVENTION

1. Technical Field

The present invention relates generally to tools and instruments and more particularly to a tool for restricting the maximum opening of a throttle valve by limiting the amount by which an accelerator pedal lever may be actuated.

2. Discussion

During the preproduction development of a vehicle, it is frequently necessary to conduct tests on the vehicle wherein the engine is operated at a specific throttle position or up to a predetermined maximum throttle position. These tests are commonly employed to either compare the designs of several components and evaluate their performance, obtain data on a particular vehicle configuration which would be used for software programming or the design of other components, or to identify the cause of a problem and aid in its resolution. As many of the variables that are quantified during these tests are the resultant of the configuration of the vehicle as a whole, it is often desirable to perform these tests by driving the vehicle on a road surface, using a device to limit the maximum throttle valve position.

Similarly, when servicing a vehicle it is frequently required to diagnose engine problems or tune the operation of the engine by conduct a test wherein the engine throttle valve is operated at a specific throttle position or up to a predetermined maximum throttle position. As with the preproduction development testing, it is desirable to perform these tests using a device which will limit the throttle valve position.

It has been a common practice to employ a stop-block when conducting such tests to limit the amount range of the throttle valve to a desired maximum position. Stop-blocks are solid items which are loosely placed under the accelerator pedal; contact between the stop-block and the accelerator pedal effectively prevents the further opening of the throttle valve. While stop-blocks have proven to be somewhat effective, their use is accompanied by several substantial drawbacks.

For example, it is often difficult to obtain repeatable results when using stop-blocks, even where the same stop-block and vehicle are being used in a test. This is due to the common use of a pivot point where the accelerator pedal is connected to the accelerator pedal lever. As such, the maximum throttle valve position is influenced to a degree by the angle at which the pedal is made to contact the stop-block. The errors associated with this phenomena are dependant upon the design of the accelerator pedal and pedal lever, but become most significant when the tests are being performed by several technicians or where the accelerator pedal is operated in an unconventional manner (e.g., technician servicing the vehicle operates accelerator without being seated in the driver's seat).

Another drawback concerns the adjustment of the stop-block to "fine-tune" the maximum opening of the throttle valve. As the outcome depends not only on the overall height of the stop-block but also the relative position of the contact point between the stop-block and the accelerator pedal, efforts to fine-tune a maximum setting were largely a matter of trial-and-error and therefore, time consuming. As a result, the process of fine-tuning was a tedious and time-consuming ordeal.

The problems with stop-blocks are compounded when the tests were performed on a range of vehicles, such as when base-lining the performance of or servicing several vehicle models. The variability in the configuration of the vehicle models often required the use of many different stop-blocks, due not only to differences in the mechanical configuration of the accelerator pedal and pedal link, but also the configuration of the interior (e.g., flooring type, design of the floor pan). As such, a new stop-block was often required for every vehicle model that was tested.

Therefore, in view of these drawbacks, there remains a need in the art for an inexpensive, easily adjusted throttle stop tool which is readily adaptable to a wide range of vehicle designs and provides accurate and repeatable results.

SUMMARY OF THE INVENTION

It is one object of the present invention to provide an inexpensive and easily adjusted throttle stop tool.

It is another object of the present invention to provide a throttle stop which provides accurate and repeatable results.

It is a further object of the present invention to provide a throttle stop which is suitable for use in a wide range of vehicles.

In accordance with the present invention, an inexpensive, easily adjusted throttle stop tool which is readily adaptable to a wide range of vehicle designs and which provides accurate and repeatable results is provided. In each embodiment, the throttle stop includes a fork assembly for contacting the accelerator pedal lever, a bracket and an adjusting rod which interconnects the fork assembly and the bracket.

The fork assembly is positioned around the accelerator pedal lever and fastened to the vehicle, the adjusting rod is then threaded into the fork assembly and the bracket is then secured to the vehicle to support the adjusting rod. The bracket supports the adjusting rod, allowing it to rotate about its axis so as to thread the adjusting rod into or out of the fork assembly.

When installed in a vehicle, the throttle stop tool is essentially a rigid linkage between the accelerator pedal lever and the vehicle floor pan or firewall which prevents the vehicle operator from positioning the accelerator pedal lever beyond a predetermined position. As the amount by which the throttle valve is opened is dependant upon the position of the accelerator pedal lever, limiting the position of the accelerator pedal lever operably limits the amount by which the throttle valve can be opened.

Since the adjusting rod is threaded, adjusting the maximum throttle position is easily accomplished by turning the adjusting rod so as to thread the adjusting rod further into or out of the arm assembly. Turning the adjusting rod in this manner changes the effective length of the tool, causing the accelerator pedal lever to contact the throttle stop tool at a different point in its range of travel and thereby causing a change in the maximum amount that the throttle valve can be opened.

Coupling the throttle stop tool of the present invention to the accelerator pedal lever substantially eliminates repeatability issues which are the result of differences in the angular position of the accelerator pedal during the test. Consequently, repeatable results can be obtained regardless of the number of operators performing the test or the method by which the accelerator pedal is actuated.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is an exploded view of a throttle stop tool in accordance with a second embodiment of the present invention.

DETAILED DESCRIPTION OF THE PREFERRED EMBODIMENT

Figure 1:
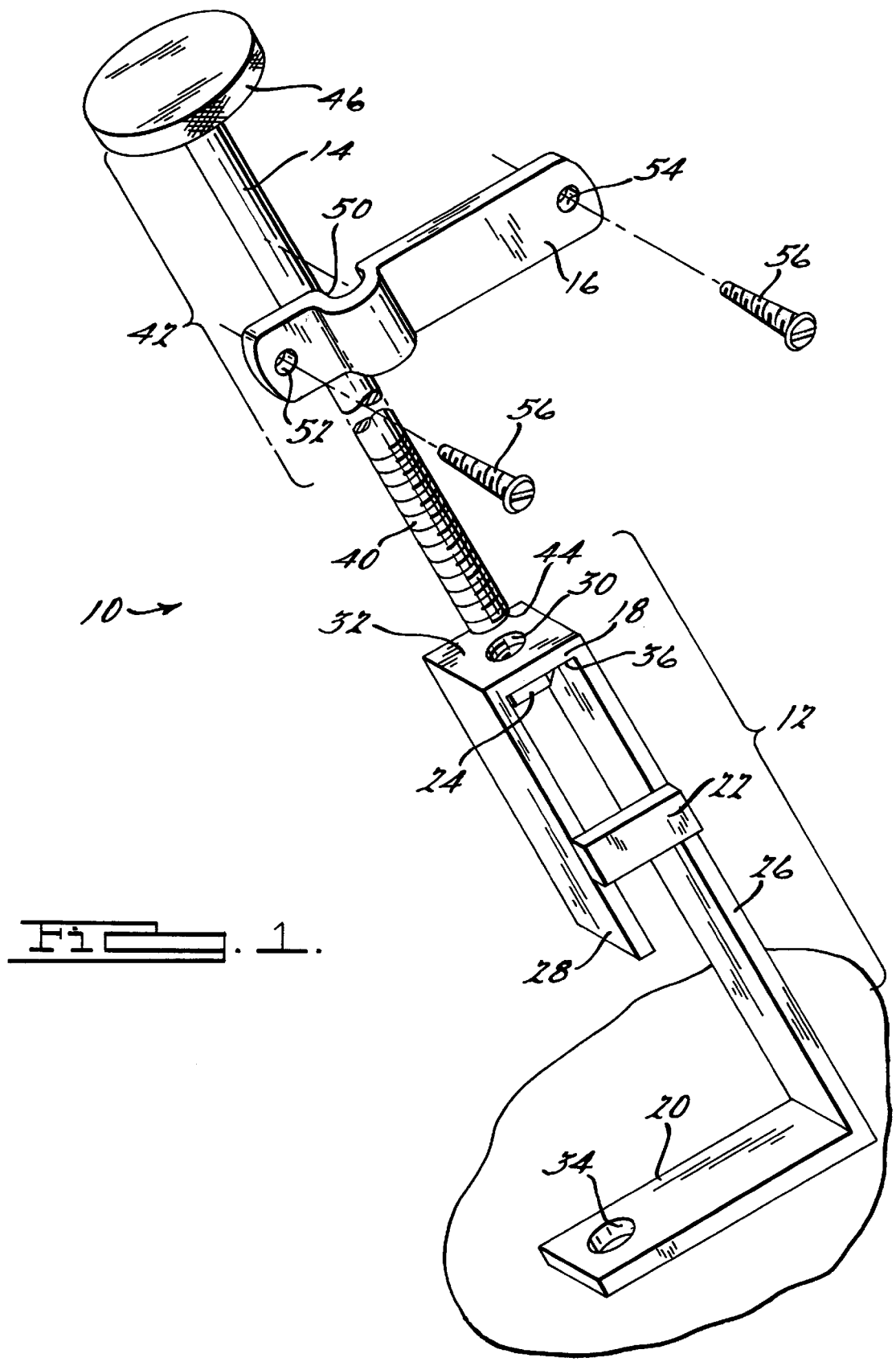
FIG. 1 is an exploded view of a throttle stop tool in accordance with a first embodiment of the present invention.
Figure 2:
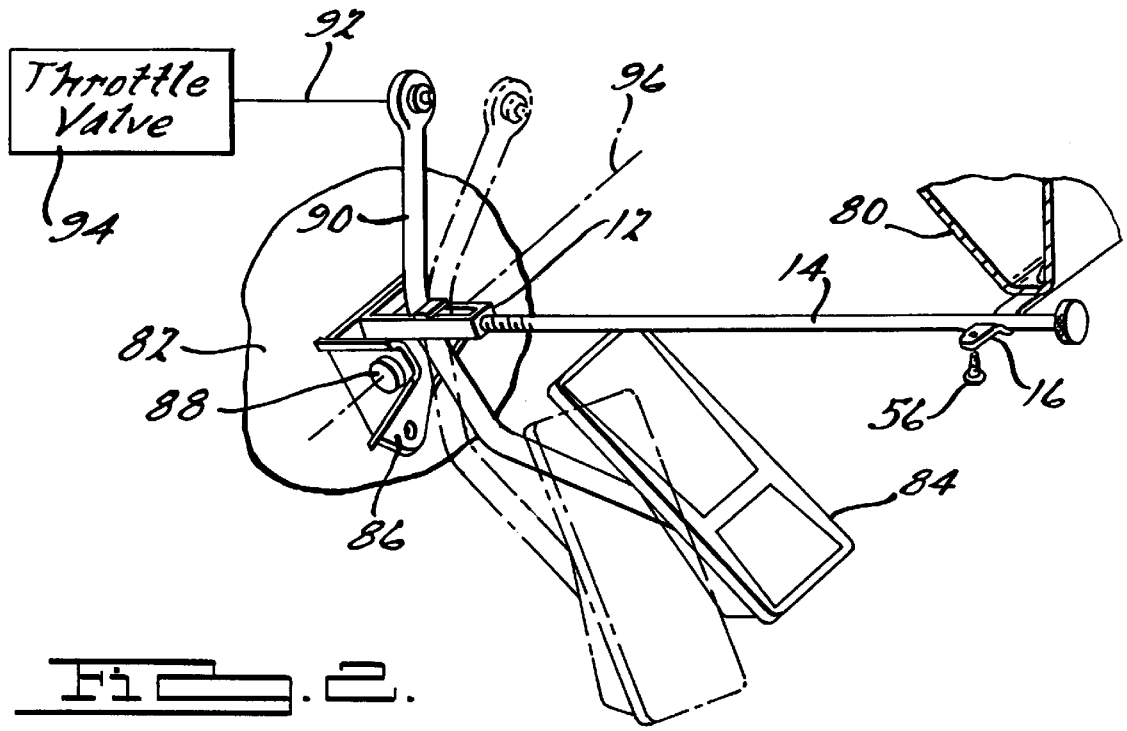
FIG. 2 is a partial view of the throttle stop tool according the first embodiment of the present invention in use in a vehicle.

Referring to FIGS. 1 and 2, a throttle stop tool according to a first embodiment of the present invention is shown. Throttle stop tool 10 is shown to include fork assembly 12, adjusting rod 14 and bracket 16.

Fork assembly 12 is a welded fabrication comprised of fork 18, base 20, brace 22 and nut 24. Fork 18 is generally "U" shaped with first leg 26 being longer than second leg 28. Fork 18 also includes aperture 26 located in top surface 32. Base 20 is welded to the distal end of first leg 26 and extends laterally across the axis of fork 18. Base 20 includes an aperture 34 which is sized to allow its attachment to the vehicle through a pre-existing fastener, such as a bolt for securing the accelerator support bracket to the firewall or floor pan of the vehicle (not shown). Brace 22 is fixedly secured to fork 18 so as to prevent first and second legs 26 & 28 from spreading apart during the use of throttle stop tool 10. Nut 24 is positioned on interior surface 36 relative to aperture 30 so as to allow a threaded rod (not shown) to pass through aperture 30 and threadably engage nut 24.

Adjusting rod 14 includes a threaded portion 40, a body portion 42 and a handle 46. Threaded portion 40 is sized to correspond to the thread size of nut 24. Bracket 16 includes contoured portion 50 and first and second apertures 52 & 54. Apertures 52 & 54 are positioned and sized so as to allow bracket 16 to be secured to dash panel 80 through screws 56 which are placed in the dash panel mounting holes (not shown). Alternatively, any retaining means, including spring clips, would be used to mount bracket 16 to dash panel 80.

With specific reference to FIG. 2, throttle stop tool 10 is shown to be operably installed in vehicle. The vehicle is conventionally shown to include dash panel 80, fire wall 82, accelerator pedal 84, accelerator pedal support bracket 86, accelerator pedal lever pivot pin 88, accelerator pedal lever 90, throttle cable 92 and throttle valve 94. Operation of accelerator pedal 84 by the vehicle operator causes accelerator pedal lever 90 to rotate about its pivot axis 96. Depressing accelerator pedal 84 (as shown in phantom) causes accelerator pedal lever 90 to rotate away from firewall 82, pulling throttle cable 92 away from firewall 82 and causing throttle valve 94 to open. As throttle valve 94 is spring loaded, releasing accelerator pedal 84 causes accelerator pedal lever 90 to rotate back toward firewall 82 and throttle valve 94 to close.

Fork assembly 12 is initially placed over accelerator pedal lever 90 at a point above pivot axis 96 and is secured to firewall 82 with a pre-existing fastener, such as accelerator pedal support bracket bolt (not shown). Adjusting rod 14 is then placed through aperture 30 and threaded into nut 24. Bracket 16 and adjusting rod 14 are then coupled together such that body portion 42 is in contact with contoured section 50. Bracket 16 is then secured to dash panel 80 with screws 56.

At throttle valve openings that are less than the predetermined amount, throttle stop tool 10 does not interfere with the operation of the accelerator pedal lever 90. However, at the predetermined maximum throttle valve opening, the end 44 of threaded portion 40 contacts accelerator pedal lever 90, preventing its further actuation. As the amount by which the throttle valve 94 is opened is dependent upon the position of the accelerator pedal lever 90, limiting its further actuation effectively limits the maximum amount by which the throttle valve 94 can be opened. However, since throttle stop tool 10 does not interfere with the operation of the accelerator pedal lever 90 at throttle valve openings which are less than the predetermined maximum, the accelerator pedal lever 90 remains operable to cause the opening of the throttle valve 94 any at position at or between its fully closed position and the predetermined maximum position.

Adjustments to the maximum throttle valve opening are made by turning adjusting rod 14. Turning adjusting rod 14 to increase the effective length of the tool causes threaded portion 40 to contact accelerator pedal lever 90 at an earlier point in its range, allowing the operator to reduce the maximum throttle valve opening. Conversely, turning the adjusting rod 14 to decrease the effective length of the tool causes threaded portion 40 to contact accelerator pedal lever 90 at a later point in its range, allowing the operator to increase the maximum throttle valve opening.

Figure 4:
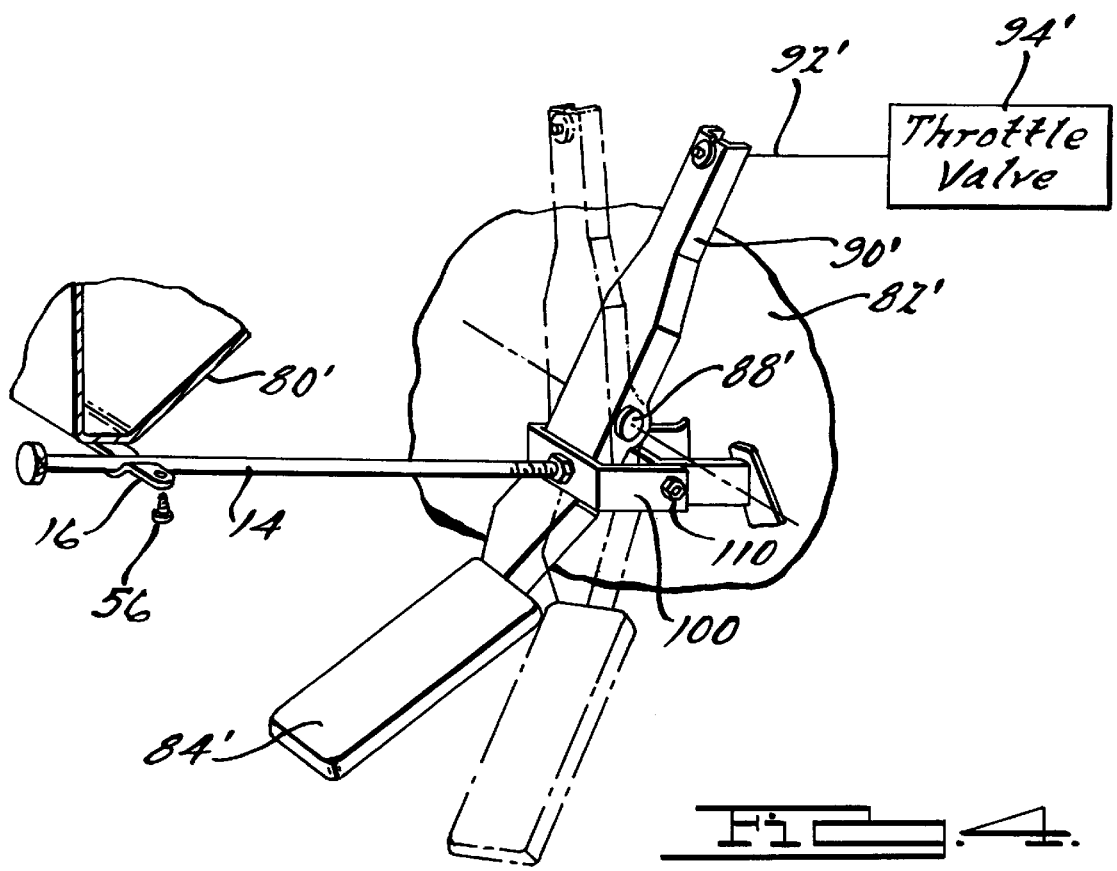
FIG. 4 is a partial view of the throttle stop tool according the second embodiment of the present invention in use in a vehicle.

Referring to FIGS. 3 and 4, a throttle stop tool according to a second embodiment of the present invention is shown. Throttle stop tool 10' is shown to include fork assembly 100, adjusting rod 14 and bracket 16.

Fork assembly 100 is shown to include fork 102, nut 104, guide 106 and stop 108, and stop retainer 110. Fork 102 is a generally "U" shaped fabrication and includes a side aperture 112 in each leg and a top aperture (not shown) in top surface 116. Nut 104 is positioned on top surface relative to the top aperture such that the threaded end 40 of adjusting rod 14 can be threadably engaged into nut 104 and pass through the top aperture.

Guide 106 includes guide portion 120 and base portion 122. Guide portion is generally "U" shaped, includes slotted apertures 124 in each of its legs and is fixedly secured to base portion 122. Base portion 122 is contoured and includes pads 126 as well as mounting aperture 128. Mounting aperture 128 is sized to enable guide 106 to be secured to the firewall or floor pan of a vehicle through pre-existing fasteners, such as those used to secure the steering column support to the vehicle (not shown). The contour of guide portion 120, as well as the positioning and height of pads 126, are configured in a manner which allows guide 106 to be placed over accelerator pedal lever 90' and not contact it at any point in its entire range of operation.

Guide 106 is initially placed over accelerator pedal lever 90' at a point below its pivot axis 96' and secured to firewall 82' with a pre-existing fastener. Fork 102 is then placed over guide portion 120, stop 108 is placed through the side apertures 114 and slotted apertures 124 and retained in place through stop retainer 110. In the preferred embodiment, stop 108 is a high quality, heat-treated (e.g., SAE grade 8) bolt and stop retainer 110 is an appropriately sized nut. Adjusting rod 14 is then threaded into nut 104 and coupled with bracket 16 such that body portion 42 is in contact with contoured section 50. Bracket 116 is then secured to dash panel 80' through screws 56.

In operation, throttle stop tool 10' does not interfere with the operation of the accelerator pedal lever 90' at throttle valve openings less than the predetermined maximum amount. However, as throttle valve 94' is opened to the predetermined maximum opening, accelerator pedal lever 90' is brought into contact with stop 108 which caused the end 44 of threaded portion 40 to contact the top surface 121 of guide portion 120, thereby preventing the further actuation of the accelerator pedal lever 90' and effectively limiting the maximum amount by which the throttle valve 94' can be opened.

While the invention has been described in the specification and illustrated in the drawings with reference to several embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

I claim:

1. An apparatus for use with a vehicle having a dash panel, a throttle valve, and an accelerator pedal lever, said accelerator pedal lever connected to said throttle valve and operable for causing said throttle valve to operate between a fully closed position and a fully opened position, said apparatus comprising:
    a first member adapted to be secured to said vehicle proximate said accelerator pedal lever;
    a second member threadably engaged with said first member; and
    a third member coupled to said second member and adapted to be fixed to said dash panel, said third member supporting said second member so as to allow rotation of said second member about an axis;
    wherein said apparatus inhibits movement of said accelerator pedal lever beyond a predetermined maximum point to limit an amount by which said throttle valve is opened to a predetermined maximum throttle valve opening, and wherein said apparatus does not interfere with the operation of said accelerator pedal at throttle valve openings less than the predetermined maximum throttle valve opening.

2. The apparatus of claim 1, wherein contact between said second member and said accelerator pedal lever inhibits said throttle valve from opening beyond the predetermined maximum throttle valve opening.

3. The apparatus of claim 1, wherein contact between said first member and said accelerator pedal lever inhibits said throttle valve from opening beyond the predetermined maximum throttle valve opening.

4. An apparatus for use with a vehicle having a dash panel, a throttle valve, and an accelerator pedal lever, said accelerator pedal lever connected to said throttle valve and operable for causing said throttle valve to operate at a fully closed position, a fully opened position, or any position therebetween, said apparatus for limiting the position of said throttle valve to a maximum predetermined position, said apparatus comprising:
    a fork assembly adapted to be secured to said vehicle and positioned proximate to said accelerator pedal lever;
    an adjusting rod threadably engaged with said fork assembly; and
    a bracket coupled to said adjusting rod and adapted to be fixed to said dash panel, said bracket supporting said adjusting rod so as to allow rotation of said adjusting rod about an axis;
    wherein said adjusting rod inhibits movement of said accelerator pedal lever beyond a predetermined maximum point to limit an amount by which said throttle valve is opened to a predetermined maximum throttle valve opening, and wherein said adjusting rod does not interfere with the operation of said accelerator pedal at throttle valve openings less than the predetermined maximum throttle valve opening.

5. An apparatus for use with a vehicle having a dash panel, a throttle valve, and an accelerator pedal lever, said accelerator pedal lever connected to said throttle valve and operable for causing said throttle valve to operate at a fully closed position, a fully opened position, or any position therebetween, said apparatus for limiting the position of said throttle valve to a maximum predetermined position, said apparatus comprising:
    a fork assembly having a stop for contacting a rear side of said accelerator pedal lever, said fork assembly adapted to be fastened to said vehicle;
    an adjusting rod threadably engaged with said fork assembly; and
    a bracket coupled to said adjusting rod and adapted to be fixed to said dash panel, said bracket supporting said adjusting rod so as to allow rotation of said adjusting rod about an axis;
    wherein said stop inhibits movement of said accelerator pedal lever beyond a predetermined maximum point to limit an amount by which said throttle valve is opened to a predetermined maximum throttle valve opening, and wherein said stop does not interfere with the operation of said accelerator pedal at throttle valve openings less than the predetermined maximum throttle valve opening.

\* \* \* \* \*